US006865886B2

(12) United States Patent
Jensen et al.

(10) Patent No.: US 6,865,886 B2
(45) Date of Patent: Mar. 15, 2005

(54) HYDRAULIC CONTROL SYSTEM

(75) Inventors: Knud Meldgaard Jensen, Augustenborg (DK); Carl Christian Dixen, Sydals (DK); Henrik Kjer Kristiansen, Augustenborg (DK); Hans Jørgen Jensen, Nordborg (DK); Jan Maibøll Buhl, Sonderborg (DK)

(73) Assignee: Sauer-Danfoss ApS (DK)

( * ) Notice: Subject to any disclaimer, the term of this patent is extended or adjusted under 35 U.S.C. 154(b) by 56 days.

(21) Appl. No.: 10/405,174

(22) Filed: Apr. 2, 2003

(65) Prior Publication Data

US 2003/0196545 A1 Oct. 23, 2003

(30) Foreign Application Priority Data

Apr. 17, 2002 (DE) ........................................ 102 16 958

(51) Int. Cl.[7] ................................................ F16D 31/02
(52) U.S. Cl. ........................................... 60/466; 91/447
(58) Field of Search ............................. 60/466; 91/445, 91/447

(56) References Cited

U.S. PATENT DOCUMENTS

| | | | | | |
|---|---|---|---|---|---|
| 3,951,162 | A | * | 4/1976 | Wilke | 91/447 |
| 4,342,256 | A | | 8/1982 | Andersen et al. | |
| 4,364,304 | A | * | 12/1982 | Andersen et al. | 91/447 |
| 4,569,272 | A | | 2/1986 | Taylor et al. | |
| 4,611,527 | A | | 9/1986 | Breeden | |
| 4,724,673 | A | | 2/1988 | Curnow | |
| 4,972,761 | A | | 11/1990 | Thomsen | |
| 4,989,703 | A | | 2/1991 | Forsyth et al. | |
| 5,323,687 | A | | 6/1994 | Zenker et al. | |
| 5,960,695 | A | | 10/1999 | Aardema et al. | |

FOREIGN PATENT DOCUMENTS

| | | |
|---|---|---|
| DE | 3800188 | 11/1990 |
| DE | 4235762 | 6/1994 |
| DE | 19709958 | 9/1998 |
| DE | 19720454 | 11/1998 |
| EP | 0226844 | 7/1987 |

* cited by examiner

*Primary Examiner*—Edward K. Look
*Assistant Examiner*—Michael Leslie

(57) ABSTRACT

A hydraulic control system (1) has a hydraulic motor (10), which is connected with a control valve (2) via two working lines (8, 9), the control valve (2) being connected with a low-pressure connection (T) and, via a compensation valve (4), with a high-pressure connection (P), to ensure that a return compensation valve (14, 15) is arranged in each working line, each return compensation valve (14, 15) having a nominal flow line (29), which extends unintersectedly in relation to the nominal flow line (28) of the compensation valve (4).

10 Claims, 2 Drawing Sheets

HYDRAULIC CONTROL SYSTEM

FIELD OF THE INVENTION

The invention relates to a hydraulic control system with a hydraulic motor, which is connected with a control valve via two working lines, the control valve being connected with a low-pressure connection and, via a compensation valve, with a high-pressure connection.

BACKGROUND OF THE INVENTION

In dependence of the desired operation direction of the motor on existing control valves, the control valve releases flow paths, from the high-pressure connection to a working line on the one side and from the other working line to the low-pressure connection on the other side. This release, however, occurs in a more or less throttled manner, the height of the throttling resistance depending on the operating stroke (or another corresponding operating movement) of the control valve. In this connection, the compensation valve serves as pressure control valve. In some cases, it is also called pressure balance. It ensures that the pressure over the slide of the control valve is practically always the same. Expediently, the compensation valve exists in the form of a slide, which is acted upon on the one side by a return spring and the load pressure and on the other side by the pressure in a line section between the compensation valve and the control valve.

Usually, such control valves work reliably. Problems occur, when the motor is working with the so-called negative loads. Such negative loads occur, for example, when the motor is activated by an external weight, for example a load hanging in a crane hook. Another example is a vehicle's own weight, which drives on a sloping surface or has to be braked from a certain speed. In this case, the hydraulic system of the control device may tend to oscillate.

It is, therefore, known to arrange a return compensation valve in a working line between the motor and the control valve, which return compensation valve an also be made as a pressure control valve or a pressure balance valve. The return compensation valve ensures that the motor can only be activated, when it is still supplied with pressurised hydraulic fluid.

However, also here oscillations of the system can be observed.

It is therefore an object of this invention to ensure a stable operation in both directions in connection with negative loads in a hydraulic control system.

This and other objects will be apparent to those skilled in the art.

SUMMARY OF THE INVENTION

In a hydraulic control system as mentioned in the introduction, this task is solved in that a return compensation valve is arranged in each working line, each return compensation valve having a nominal flow line, which extends unintersectedly in relation to the nominal flow line of the compensation valve.

That is, each working line has its own return compensation valve. This ensures that negative loads can be controlled in both working directions. Additionally, it is ensured that the return compensation valves on the one hand and the compensation valve on the other hand, that is the two valves or valve groups on both sides of the control valve, are harmonised with each other. The two return compensation valves on the one hand and the compensation valve on the other hand have nominal flow lines, which do not cover each other, and which extend unintersectedly in relation to each other. Thus, independently of the direction, in which the control valve is activated, it is always ensured that only one compensation valve, that is, either the compensation valve or one of the return compensation valves can become active. This makes the system stable, even with negative loads. Here, the nominal flow line is the relation between the flow amount and the pressure, the pressure being either the pressure difference over the compensation valve or the return compensation valve, respectively, or the pressure at the outlet of the compensation valve or the return compensation valve, respectively. The fact that the nominal flow lines neither cover nor intersect each other means that a point does not exist, in which a critical situation can occur. It is always clearly settled, which of the compensation valves is "in charge" of the control of the hydraulic fluid.

It is preferred that the nominal flow lines of the two return compensation valves are equal. Thus, coping with negative loads in both directions will be equal.

Preferably, the nominal flow lines of the return compensation valves and of the compensation valve are parallel to each other. When controlling positive or negative loads, this gives a substantially equal control behaviour, which merely differs by an offset. This makes the control easier for an operator. The smaller the offset between the two curves is, the simpler will the operation be. In an alternative it can be imagined that the curves start in the same point and extend at a small angle in relation to each other.

Further, all other things being equal, the return compensation valves have a larger flow than the compensation valve. This ensures that the return compensation valves or the return compensation valve, respectively, which takes over the control, always permits a larger flow than the compensation valve. In the case of a negative load it is thus obvious that the return compensation valve takes over the control and that the compensation valve has no influence on the control of the flow amount. As more fluid can flow off through the return compensation valve, it is prevented that the hydraulic system of the control device is "pumped up".

Also, an anti-cavitation valve arrangement ends between the motor and the return compensation valves. As stated, the amount of fluid flowing off through the return compensation valve, which is in charge in one direction in connection with a negative load, can, under certain circumstances, be larger than the amount of fluid flowing in through the compensation valve. This might cause cavitation, which is prevented by the anti-cavitation valve arrangement. The anti-cavitation valve arrangement enables that a sufficient amount of hydraulic fluid can again be supplied to the circuit.

The anti-cavitation valve arrangement has a shiftable non-return valve. When the non-return valve is closed, a connection of the low-pressure line to the tank is interrupted, that is, hydraulic fluid cannot be resupplied from the tank. As, however, with negative loads, sufficient hydraulic fluid is supplied on the outlet side of the motor, said fluid being meant for reaching the tank via the low pressure connection, this fluid can, in a manner of speaking, be circulated inside the control device. Under certain circumstances, this gives even substantial energy savings. When imagining that the nominal flow lines of the compensation valve on the one side and of the return compensation valves on the other side extend in parallel, it is possible, by means of the anti-cavitation valve arrangement, to refill the area between the two nominal flow lines.

The shiftable non-return valve closes automatically in connection with negative loads. Thus, it is no longer necessary to perform a certain activity, namely to close the non-return valve, in order to achieve energy savings. The non-return valve is automatically closed, when the return compensation valves are activated. It is not required to have a complete blocking of the fluid flow.

The compensation valve has a smaller spring tension than the return compensation valves. This is a relatively simple way of providing the compensation valve on the one side and the return compensation valves on the other side with different nominal flow lines. The pressure required to move the compensation valve to the closed position is lower than that required to close the return compensation valves.

In an alternative or additional embodiment it may be ensured that in the flow direction from the high-pressure connection to the motor the control valve has a larger flow resistance than in the flow direction from the motor to the low-pressure connection. This also makes it possible to realize the pressure conditions in such a way that the nominal flow lines of the compensation valve on the one side and the return compensation valves on the other side have different extensions, meaning that they neither cover nor intersect each other.

In a preferred embodiment it is ensured that each return compensation valve is provided with a load sensing connection acting in the opening direction and with a control connection acting in the closing direction and being connected with a section of the working line leading to the control valve, and that the return compensation valve in the working line, through which hydraulic fluid flows to the motor, is acted upon through the load sensing connection by the pressure also ruling in the working line. This ensures in a simple manner that the compensation valve or the return compensation valve, respectively, which is not supposed to take part in the control, is completely opened. This means that the influence of this valve is practically precluded. This gives a highly stable control opportunity.

DESCRIPTION OF THE EMBODIMENTS OF THE INVENTION

Figure 1:
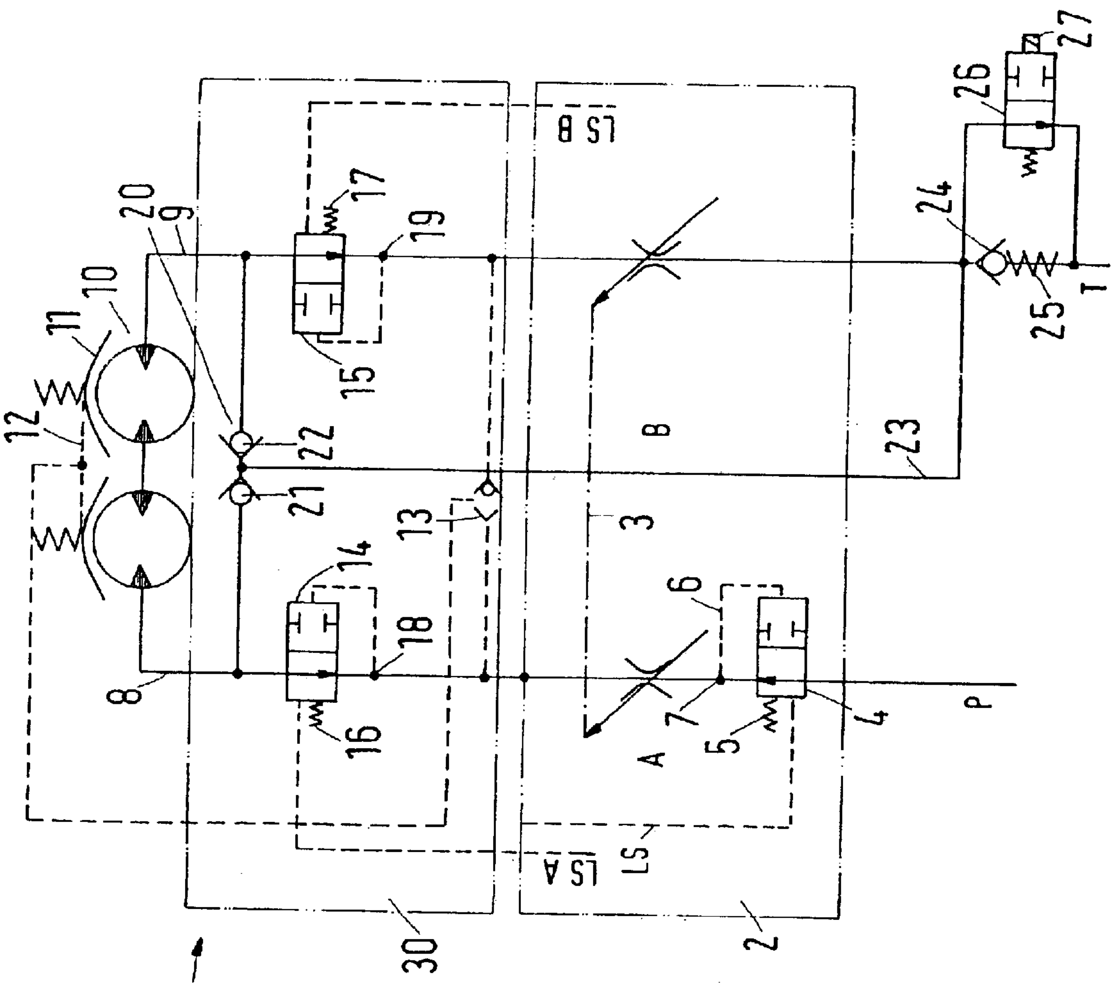
FIG. 1 is a schematic view of the hydraulic control system of this invention.

A control device 1 has a proportional valve 2 as control valve, which is merely shown schematically in FIG. 1. The proportional valve 2 has two adjustable throttles A, B, which can be adjusted by means of an operating handle 3, which is also only shown schematically. The proportional valve 2 is connected with a high-pressure connection P and a low-pressure connection T. In the connection to the high-pressure connection P is arranged a compensation valve 4, which has a return spring 5 prestressing the compensation valve 4 in the opening direction. For this purpose, the compensation valve 4 can, for example, have a slide, which is loaded by the return spring 5 in the opening direction. In the closing direction, the slide can be acted upon via the line 6 by a pressure at a point 7 between the compensation valve 4 and the throttle A. When the throttle A is closed, the pressure at the point 7 increases to a level, which closes the compensation valve 4. When the throttle A is opened, the pressure at the point 7 is reduced, and the return spring 5 can open the compensation valve 4 further. For this reason, the compensation valve 4 can also be called pressure control valve or pressure balance valve.

The proportional valve 2 is connected with a motor 10 via working lines 8, 9. In the present case, the motor 10 consists of two part drives, both acting upon the wheels of a vehicle. The motor 10 is provided with a brake 11, which can be released via a control line 12. In the control line, the pressure rules behind the throttle A. As, in a manner not shown in detail, the proportional valve 2 can also lead the pressure from the high-pressure connection P via the throttle B to the motor 10, a shuttle valve 13 is provided, which uses the highest pressure between the throttles A, B for releasing the brake 11.

Additionally, the compensation valve 4 is acted upon by a load sensing pressure LS in the opening direction, that is, the load sensing pressure LS acts in the same direction as the return spring 5. The return spring 5 produces a force, which, for example, corresponds to a pressure of 7 bars.

In the working line 8 is arranged a return compensation valve 14, and in the working line 9 is arranged a return compensation valve 15. Both return compensation valves 14, 15 are acted upon in the opening direction by return springs 16, 17. Both return springs 16, 17 produce a force, which corresponds to, for example, 8 bars. In the same direction acts a pressure in a load sensing connection LSA for the return compensation valve 14 and LSB for the return compensation valve 15.

In the closing direction, the return compensation valve 14 is acted upon by a pressure at a point 18 between the proportional valve 2 and the return compensation valve 14. In the same way, the return compensation valve 15 is acted upon in the closing direction by a pressure at a point 19 between the proportional valve 2 and the return compensation valve 15.

An anti-cavitation valve arrangement 20 with an anti-cavitation valve 21 for the working line 8 and an anti-cavitation valve 22 for the working line 9 is connected with the low-pressure connection T via an anti-cavitation line 23. However, between the low-pressure connection T and the anti-cavitation line 23 is arranged an additional parallel connection of a non-return valve 24, which is prestressed by a spring 25, and a non-return valve 26. The non-return valve 26 has a magnetic drive 27, which can switch the non-return valve from the open position shown to a closed position. In the closed position of the non-return valve 26 a refilling from the low-pressure connection T is not possible.

The control device 1 works as follows:

As long as the two throttles A, B of the proportional valve 2 are closed, the pressure 0 rules also in the load sensing connection LS, so that the brake 11 retains the motor 10. As soon as the proportional valve 2 is activated, that is, the throttles A, B are opened, the pressure in the load sensing line LS increases, so that the brake 11 is released.

When the two throttles A, B of the proportional valve 2 are opened, the pressure at the point 7 decreases and the compensation valve 4 opens, so that hydraulic fluid can flow to the motor 10 through the return compensation valve 14. The return compensation valve 14 is acted upon in the one direction by the pressure at point 18, that is, by the pressure in the working line 8. In the other direction, the return compensation valve 14 is, however, acted upon by the pressure at the load sensing connection LSA, which corresponds to the pressure after the throttle A (that is, also the pressure in the working line 8), so that the return compensation valve 14 is completely opened. In the same way, the return compensation valve 15 is completely opened. The return compensation valve 15 is acted upon in the closing direction by the pressure at point 19, that is, by the pressure in the working line 9. In the opening direction, the force of the return spring 17 and the pressure in the load-sensing connection LSB, which is at least as large as the pressure in the point 19, act upon the return compensation valve 15. Thus, the hydraulic fluid more or less unpreventedly reaches through the return compensation valve 15 and through the throttle B to the low-pressure connection T, flowing off through the non-return valve 26, which is open. If the non-return valve 26 is closed, the hydraulic fluid can pass through the return valve 24, when it can overcome the force of the spring 25. This force, for example, corresponds to a pressure of 5 bars.

The vehicle driven in this way can now get into a situation, in which the motor 10 does not drive, but is driven. This is, for example, the case, when the vehicle drives down a slope or is braked from a certain speed. In this case, the motor supplies more hydraulic fluid into the working line 9 as it receives through the working line 8 from the high-pressure connection P. Accordingly, the pressure in the point 18 decreases. The return compensation valve 14 remains completely open. At the point 19, however, the pressure increases, as the hydraulic fluid flowing off must pass through the throttle B, which with a large fluid amount causes an accordingly larger pressure drop. At the same time, the pressure in the load sensing line LSB (pressure between the throttle B and the low-pressure connection) is the tank pressure, so that the return compensation valve 15 is displaced to a more heavily throttled position against the force of the return spring 17. The flow through the control device 1, that is, the control of the motor 10, thus still occurs via the proportional valve 2. However, the fluid amount supplied to the proportional valve 2 is exclusively determined via the return compensation valve 15 and no longer through the compensation valve 4 on the inlet side of the proportional valve 2.

Figure 2:
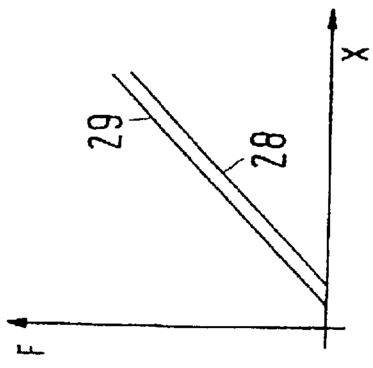
FIG. 2 is a schematic view of nominal hydraulic lines.

This is described on the basis of the nominal flow lines shown in FIG. 2. Upward is shown the flow F and to the right a deflection X of the slide of the proportional valve 2. In other words, the value X also corresponds to the counter pressure, which the return compensation valves 14, 15 or the compensation valve 4, respectively, "experience" at the points 18, 19 or 7, respectively.

A nominal line 28 shows the behaviour of the compensation valve 4, that is, the fluid amount in dependence of the position of the proportional valve 2 for the case, when the vehicle is driven via the motor 10. Thus, the nominal flow line 28 is the nominal flow line of the compensation valve 4.

A nominal flow line 29, however, is the nominal flow line of the return compensation valves 14, 15. This is the same for both return compensation valves 14, 15. It shows the flow in dependence of the position of the proportional valve 2 for the case, when the vehicle drives the motor 10.

It is obvious that the two nominal flow lines 28, 29 are not congruent and that they do not intersect each other. On the contrary, they extend in parallel with each other. Thus, it is ensured that the fluid control through the control device 1 occurs either through the compensation valve 4, namely with positive loads, or exclusively through one of the two return compensation valves 14, 15 with negative loads.

When a negative load occurs, the non-return valve 26 is closed. In this case, the anti-cavitation valve arrangement 20 can no longer suck fluid from the low-pressure connection T. However, it can suck the required fluid via the line 23 from the low-pressure end of the throttle B via the valve 21 into the working line 8, so that cavitation will not occur here. As, for a small distance, the hydraulic fluid can be led in a circle, a small energy saving will occur with negative loads. Mainly, however, an efficient refilling is achieved.

With the different nominal flow lines 28, 29, it is thus ensured that with a given slide deflection of the proportional valve 2 the flow is different in dependence of whether positive or negative loads are concerned. Thus, it is ensured that the compensation valve 4 on the one side and the return compensation valves 14, 15 on the other side do not "fight" to find out, who is responsible. On the contrary, it is clearly defined that with a positive load exclusively the compensation valve 4 is responsible, whereas with a negative load exclusively one of the two return compensation valves 14, 15 is responsible. In the simplest case, this can be achieved by means of different prestressing of the return springs 5 on the one side and 16, 17 on the other side. For example, the spring 5 can be prestressed so that it corresponds to a pressure of 7 bars, whereas the springs 16, 17 are prestressed so that they correspond to a pressure of 8 bars.

The two return compensation valves 14, 15 can be combined to one component 30. The component 30 can, for example, be arranged directly at the belonging proportional valve 2. The component 30 only requires little space. It can also be arranged immediately next to the motor 10.

In a manner of speaking, the anti-cavitation valve arrangement 20 fills the area between the two nominal flow lines 28, 29. Thus, it ensured that cavitation does not occur in the control device 1.

Figure 3:
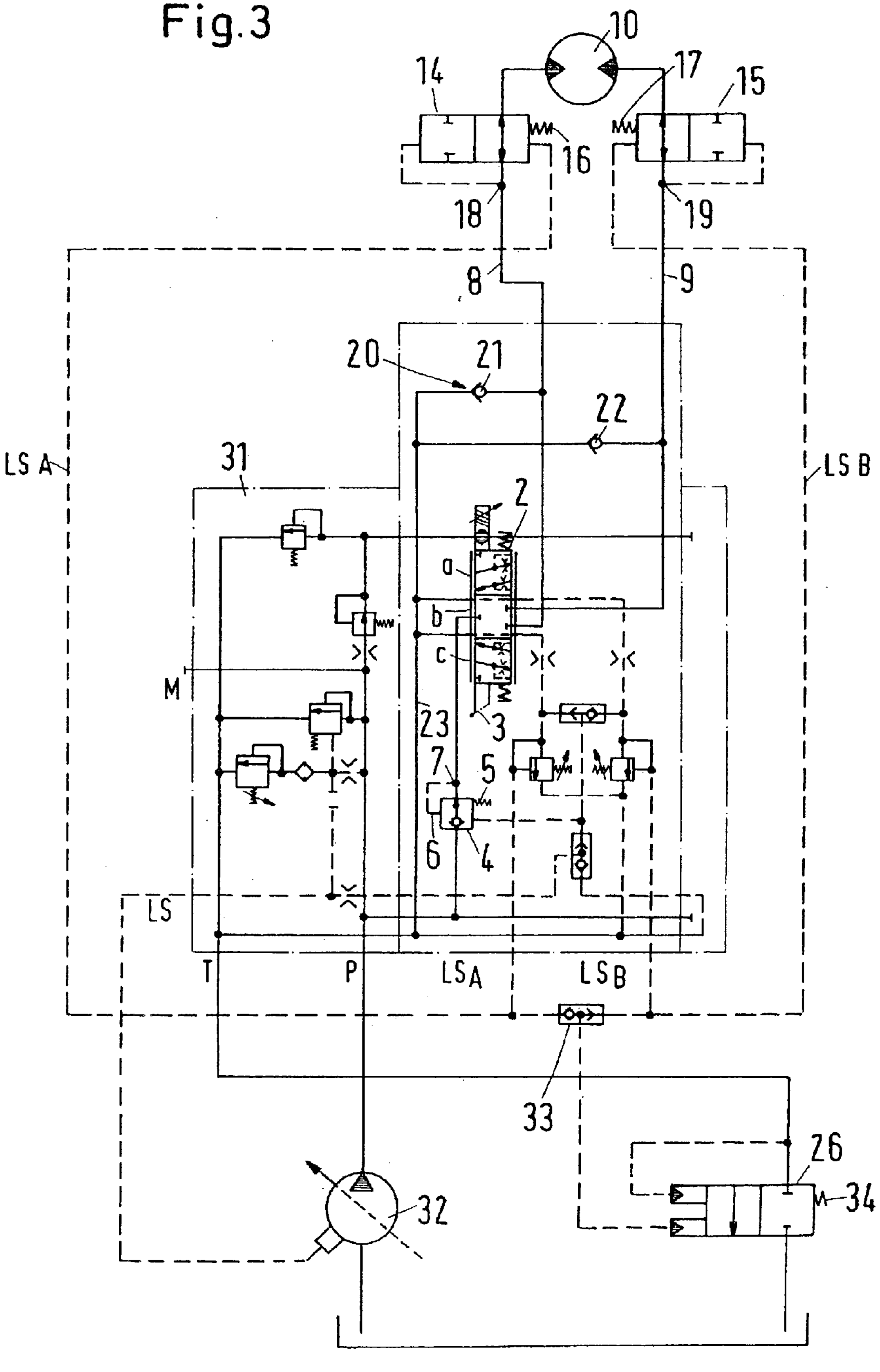
FIG. 3 is a schematic view of a second embodiment of a hydraulic control system of this invention.

FIG. 3 shows an embodiment of a control device, in which the same and corresponding parts have the same reference numbers.

The control device in FIG. 3 has an inlet module 31, which is provided with a number of known valves (not shown), such as, pressure control valves and pressure relief valves. Via this inlet module 31, the proportional valve 2 is connected with the high-pressure connection P, the compensation valve 4 being arranged in said connection.

The proportional valve 2 has three working positions a, b, c. In the shown position b, the proportional valve 2 is in the neutral position. In this case, the load sensing line LS is acted upon by the pressure in the low-pressure connection T. Accordingly, the brakes 11 are activated and the vehicle is braked.

When the slide of the proportional valve 2 is displaced to the position a, the high-pressure connection P is connected with the working line 9 and the low-pressure connection T with the working line 8. At the same time, the load sensing line LSB is acted upon by the pressure at the point 19 and the load sensing line LSA is acted upon by the pressure at the low-pressure connection T. When in this case, in the position a of the proportional valve 2, the motor is driving, hydraulic fluid under pressure from a pump 32 reaches the motor 10 via the high-pressure connection P, the compensation valve 4, the proportional valve 2, the working line 9 and the return compensation valve 15. In this connection, the compensation valve 4 is controlled along the nominal flow line 28 (FIG. 2), in dependence of how much the throttles of the proportional valve 2 are opened. The pressure at the point 19 also reaches the load sensing line LSB, whereas the load sensing line LSA is supplied with the pressure at the low-pressure connection T. Accordingly, under the influence of the pressure in the load sensing line LSB and the return spring 17, the return compensation valve 15 is opened against the pressure at the point 19. The "net" effect of this is that merely the force of the return spring 17 is effective. The return compensation valve 14 is completely opened, as the pressure at the point 18 substantially corresponds to the tank pressure, so that practically no force is effective in the closing direction.

When now the motor 10 is exposed to a negative load, for example, when the vehicle is to be braked from a certain speed, the vehicle thus driving the motor 10, the amount of hydraulic fluid supplied through the motor 10 is larger than that supplied through the proportional valve 2. Accordingly, the pressure at the point 18 increases, and the return compensation valve 14 controls the flow in accordance with the nominal flow line 29 (FIG. 2). As the pressure at the point 7 decreases—the hydraulic fluid is practically sucked off through the motor 10—the compensation valve 4 opens completely, so that the amount of fluid supplied to the proportional valve 2 is merely determined by the return compensation valve 14. The compensation valve supplies the amount, it has always supplied. As, however, the return compensation valve 14 is now in charge, some oil will be missing, and this oil will be resupplied.

The non-return valve 26 is acted upon on the one side by the pressure at the low-pressure connection T and on the other side by the higher of the two pressures in the load sensing lines LSA, LSB. As stated above, the pressure in the load sensing line LSA is practically 0, that is, it corresponds to the pressure at the low-pressure connection T. Also the pressure in the load sensing line LSB drops, so that, when a negative load occurs, the non-return valve 26 is automatically moved to the closed position shown in FIG. 3. The refilling via the anti-cavitation valve 22 is thus made with hydraulic fluid, which is taken from the low-pressure connection of the proportional valve 2. The non-return valve is stressed by a return spring 34, which, with correspondingly low pressures at the low-pressure connection T and in the load sensing lines LSA, LSB, displaces the non-return valve 26 to the shown position.

As mentioned above, the various nominal flow lines 28, 29 can be realized in that the return compensation valves 14, 15 are provided with stronger return springs 16, 17 than the compensation valve 4, which has a correspondingly weaker return spring 5. However, it can also be ensured that the throttles in the proportional valve 2, which lead from the high-pressure connection P to the motor 10, have a larger flow resistance than the throttles, which carry hydraulic fluid from the motor 10 to the low-pressure connection P.

It is thus seen that this invention will accomplish at least all of its stated objectives.

What is claimed is:

1. A hydraulic control system with a hydraulic motor, which is connected with a control valve via two Working lines, the control valve being connected with a low-pressure connection and, via a compensation valve, with a high-pressure connection, wherein the improvement comprises:

a return compensation valve (14, 15) is arranged in each working line, each return compensation valve (14, 15) having means for a nominal flow line (29), which extends unintersectedly in relation to a nominal flow line (28) of the compensation valve (4).

2. A hydraulic control system according to claim 1, wherein the nominal flow lines (29) of the two return compensation valves (14, 15) are equal.

3. A hydraulic control system according to claim 1, wherein the nominal flow lines (28, 29) of the return compensation valves (14, 15) and of the compensation valve (4) are parallel to each other.

4. A hydraulic control system according to claim 1, wherein the return compensation valves have a larger flow than the compensation valve.

5. A hydraulic control system according to claim 1, wherein an anti-cavitation valve arrangement (20) ends between the motor (10) and the return compensation valves (14, 15).

6. A hydraulic control system according to claim 5, wherein the anti-cavitation valve arrangement (20, 25, 26) has a shiftable non-return valve (26).

7. A hydraulic control system according to claim 6, wherein the shiftable non-return valve (26) closes automatically in connection with negative loads.

8. A hydraulic control system according to claim 1, wherein the compensation valve (4) has a smaller spring tension than the return compensation valves (14, 15).

9. A hydraulic control system according to claim 1, wherein in the flow direction from the high-pressure connection (P) to the motor (10) the control valve (2) has a larger flow resistance than in the flow direction from the motor (10) to the low-pressure connection (T).

10. A hydraulic control system according to claim 1, wherein each return compensation valve (14, 15) is provided with a load sensing connection (LSA, LSB) acting in the opening direction and with a control connection acting in the closing direction and being connected with a section of the working line (8, 9) leading to the control valve (2), and that the return compensation valve (14, 15) in the working line (8, 9), through which hydraulic fluid flows to the motor (10), is acted upon through the load sensing connection (LSA, LSB) by the pressure also ruling in the working line (8, 9).

* * * * *